United States Patent
Arool Emmanuel et al.

(10) Patent No.: US 11,888,306 B1
(45) Date of Patent: Jan. 30, 2024

(54) SYSTEM FOR IN-SITU DETECTION OF ELECTRICAL FAULTS

(71) Applicant: AMAZON TECHNOLOGIES, INC., Seattle, WA (US)

(72) Inventors: Cyril Arokiaraj Arool Emmanuel, San Jose, CA (US); David Buuck, Prunedale, CA (US); Behrad Aria, Alameda, CA (US); Mark Armin Patel, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/660,366

(22) Filed: Apr. 22, 2022

(51) Int. Cl.
*H02H 3/08* (2006.01)
*H02H 5/00* (2006.01)
*G01J 1/42* (2006.01)

(52) U.S. Cl.
CPC ............. *H02H 3/08* (2013.01); *G01J 1/429* (2013.01); *H02H 5/00* (2013.01)

(58) Field of Classification Search
CPC ............. H02H 3/08; H02H 5/00; G01J 1/429
See application file for complete search history.

(56) References Cited

U.S. PATENT DOCUMENTS

| | | | |
|---|---|---|---|
| 4,377,837 A * | 3/1983 | Matsko | H02H 7/008 361/105 |
| 7,580,232 B2 | 8/2009 | Caggiano et al. | |
| 9,413,155 B2 | 8/2016 | Blemel et al. | |
| 2014/0055886 A1 * | 2/2014 | Spangenberg | H02H 1/0023 361/2 |
| 2016/0188977 A1 | 6/2016 | Kearns et al. | |

(Continued)

FOREIGN PATENT DOCUMENTS

| CN | 109613401 A | 4/2019 |
|---|---|---|
| EP | 2571660 A2 | 3/2013 |

(Continued)

OTHER PUBLICATIONS

"Arc Fault Circuit Interrupter (AFCI)", Leviton, 2022, 9 pgs. Retrieved from the Internet: URL: https://www.leviton.com/en/products/residential/gfciafci/afci.

(Continued)

*Primary Examiner* — Scott Bauer
(74) *Attorney, Agent, or Firm* — Lindauer Law, PLLC

(57) ABSTRACT

Electrical faults pose a significant risk to people and property. A system is described that deploys instrument devices with sensors to detect faults within an alternating current (AC) electrical distribution system. These sensors may detect electrical, optical, thermal, acoustic, radio frequency, and other phenomena associated with a fault. Data from different sensors may also be used to distinguish fault and non-fault status. Users are notified if a fault status is detected. Mitigating actions may be automatically taken, such as de-energizing a branch circuit associated with the fault status. Information about non-fault status may also be used to mitigate nuisance circuit breaker interruptions. In some situations, a nuisance interruption of a breaker may be automatically reset if all instrument devices connected to the breaker reported non-fault status before the interruption.

20 Claims, 10 Drawing Sheets

(56) References Cited

U.S. PATENT DOCUMENTS

2021/0019536 A1    1/2021   Motoyama

FOREIGN PATENT DOCUMENTS

EP         2952993 A1    12/2015
WO      2018199958 A1    11/2018

OTHER PUBLICATIONS

"SmartlockPro Outlet Branch Circuit AFCI Devices", Leviton, 2021, 5 pgs. Retrieved from the Internet: URL: https://www.leviton.com/en/docs/Leviton_AFCI_Product_Brochure.pdf.

Rawat, Pallav, "Environment Perception for Autonomous Driving : A1/10 Scale Implementation of Low Level Sensor Fusion Using Occupancy Grid Mapping", Mar. 1, 2019, 67 pages, Retrieved from the Internet: URL:http://www.diva-portal.org/smash/get/diva2:1304683/FULLTEXT01.pdf.

Schwarzenberger, T., "Patent Cooperation Treaty International Search Report and Written Opinion dated Apr. 14, 2022", Patent Cooperation Treaty Application No. PCT/US22/70737, Patent Cooperation Treaty, Apr. 14, 2022.

\* cited by examiner

SYSTEM FOR IN-SITU DETECTION OF ELECTRICAL FAULTS

BACKGROUND

Electrical faults in homes and businesses cause damage to property and have the potential for loss of life.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
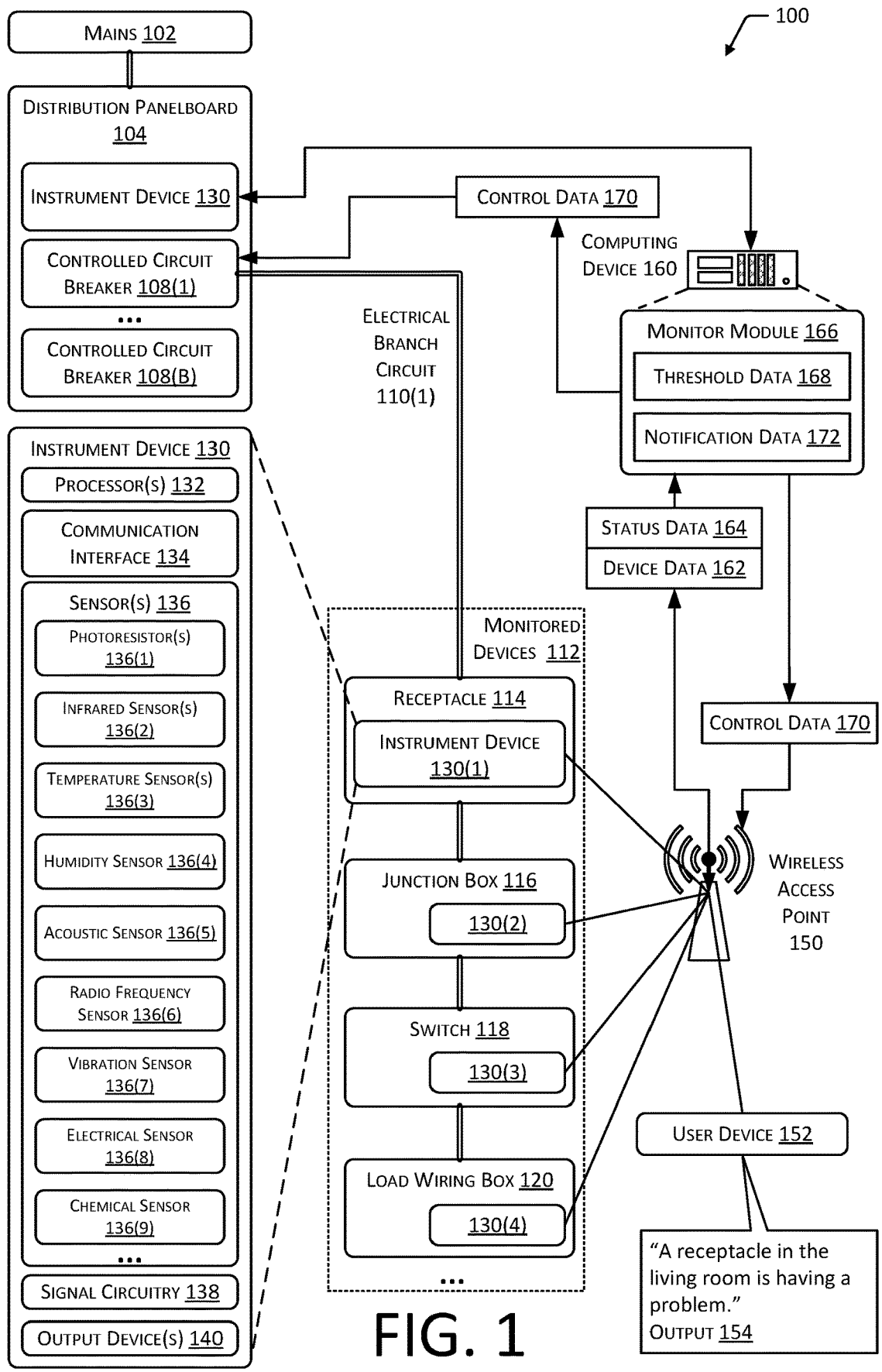
FIG. 1 illustrates a system for in-situ detection of electrical faults, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Electric power, such as alternating current (AC) electrical power, provides a convenient and effective way to distribute and harness energy. AC changes from a positive to a negative voltage over a specific period of time. For example, in the United States AC power is provided as a sine wave with a frequency of 60 Hertz. AC electrical power is distributed via electrical mains into distribution panelboards found in homes, businesses, and so forth. The distribution panelboard, sometimes known as a "main panel" or "breaker panel", has a busbar that is connected to the electrical mains. For example, the busbar may be connected to the "line" or "hot" leg of one AC phase. Connected to the busbar via devices such as circuit breakers are branch circuits, and one or more loads may be connected to each branch circuit. For example, loads may include a washing machine, microwave, air conditioner, and so forth. Other loads may also include lights or may be connected via electrical receptacles. For example, a portable vacuum cleaner plugged into an electrical receptacle is a load on the branch circuit to which the electrical receptacle is connected.

To avoid dangerous or potentially dangerous situations, a variety of protective mechanisms have been attempted. Current limiting devices such as fuses or circuit breakers installed at the distribution panelboard determine if transfer of electrical current to a branch circuit is greater than some threshold. If so, the circuit breaker electrically disconnects the branch circuit from the busbar. For example, a current-limiting circuit breaker may "trip", disconnecting the branch circuit and any connected loads from the busbar. However, current limiting devices are relatively slow to react, and can transfer substantial energy before they disconnect. For example, a direct connection involving the branch circuit may result in an electrical arc being formed that releases enough energy to ignite nearby materials such as insulation, lumber, and so forth.

Other types of protective devices attempt to determine other types of faults. A ground fault circuit interrupter (GFCI) attempts to determine if there is a current imbalance between conductors in the circuit that may be associated with an unwanted path to electrical ground. If this type of fault is detected, the GFCI disconnects the branch circuit and associated load from the busbar. For example, GFCIs are commonly used for loads that are near water, where a potential failure could result in electrocution of a person. However, GFCIs are only able to detect this particular type of failure. For example, a GFCI may not reliably detect and disconnect if an arc fault occurs.

An arc fault circuit interrupter (AFCI) attempts to determine if an electrical arc has been detected on the branch circuit. For example, an AFCI may monitor the voltage and current delivered to the branch circuit to determine if an electrical arc is present. However, AFCIs are prone to "nuisance trips", in which the branch circuit is disconnected when no arc fault was actually present. For example, the operation of circuitry within certain types of loads such as microwave ovens or AC motors may result in the AFCI incorrectly determining an arc fault and disconnecting the branch circuit. This may cause an adverse user experience in which the user experiences a power outage for that load. These can be frustrating because no dangerous condition is present, yet the user still needs to take some action to restore power. Nuisance trips may also increase dangerous situations, as users become frustrated. For example, an AFCI breaker may be replaced with a current-limiting circuit breaker to reduce nuisance trips, but this introduces the potential for other failures to occur.

AFCIs have implemented various techniques to try and reduce nuisance trips. However, these techniques may result in potentially dangerous conditions being undetected. For example, an AFCI may not detect transitory electrical arcing occurring at a screw terminal of an electrical receptacle, until a catastrophic failure results in destruction of the receptacle and potentially a fire.

Electrical wiring as installed presents many opportunities for potential failure. For example, much electrical wiring is installed with little or no oversight. Once installed, electrical wiring is difficult to inspect, and often is never inspected until after a failure occurs. Even with correct installation, over time electrical connections may become loose, contaminants may be introduced, insulation degrades over time, and so forth. For example, screw terminals may loosen over time, producing a gap between a wire and the terminal. Arcing may occur in these gaps. The traditional systems mentioned above attempt to limit the damage due to a catastrophic failure by attempting to indirectly detect these failures, but they do not provide any meaningful information to a user in advance of that catastrophic failure, nor do they detect an actual failure. Traditional systems also do not remedy the problem of ongoing nuisance trips in which these indirect detections result in false fault detections.

Described in this disclosure are systems and techniques for acquiring sensor data from instrument devices connected to an electrical distribution system, such as at a home or business. The sensor data is processed to determine status data. For example, the status data may indicate no fault detected (normal operation), potential fault detected, or serious fault detected. Based on the status data, one or more mitigating actions may be taken. The instrument device may include an output device such as a light or buzzer. These may be operated to warn a user about the potential fault or serious fault.

The distribution panelboard may utilize controlled circuit breakers including switching circuitry. The switching circuitry may be operated based on the status data. For example, if the instrument device connected to the branch circuit detects a serious fault, the switching circuitry for that branch circuit may be operated to disconnect the busbar from the branch circuit.

The instrument device may also be used to mitigate nuisance trips by providing information indicative of normal operation without faults. For example, at a first time the controlled circuit breaker operates to disconnect the busbar from the branch circuit and associated load after detecting a potential arc fault failure. However, this is a "nuisance trip" in which no actual fault occurred. Before the first time, the instrument devices on the branch circuit had status data indicating no fault detected. Based on this status data, the controlled circuit breaker may be operated to re-connect the busbar to the branch circuit, restoring power to the loads on the branch circuit. In some implementations, this information may be used as feedback to the controlled circuit breaker to reduce future nuisance trips.

The instrument device may be included with, or integrated into, various devices such as electrical receptacles, switches, junction boxes, wiring boxes, and so forth. The instrument device may communicate with other devices using wired or wireless communication interfaces. For example, the instrument devices may use powerline communications techniques or WiFi to communicate with a computing device. The computing device may be in communication with other devices. For example, an instrument device in an electrical receptacle determines a fault has occurred. The instrument device may send status data indicative of this fault to the computing device. Based on this, the computing device may then send a notification to a user device. For example, the user device may comprise a tablet computer, cellphone, internet enabled speaker, and so forth. The notification may then be presented via the user device. For example, the internet enabled speaker may announce "A receptacle in the living room is having a problem." The output device of the instrument device may be operated as well to aid the user in finding the correct device. For example, an indicator light on the failed receptacle may flash a red light.

By using the systems and techniques described in this disclosure, electrical distribution system failures are able to be detected and mitigated quickly and expeditiously, potentially before catastrophic failure. The notification may be indicative of a specific device and its location, allowing fast and cost-effective remediation of a fault. Nuisance trips may also be mitigated as well. As a result, overall safety of the electrical distribution system is improved.

Illustrative System

FIG. 1 illustrates a system 100 for in-situ detection of electrical faults, according to some implementations. Electrical power comprising one or more phases of alternating current (AC) is provided via electrical mains ("mains") 102 to a distribution panelboard 104. The distribution panelboard 104 may comprise one or more busbars. Each busbar may be connected to one line or phase of the mains 102. The distribution panelboard 130 may comprise one or more circuit breakers (not shown) or controlled circuit breakers 108(1), 108(2), . . . , 108(B).

The controlled circuit breakers 108 may comprise two terminals, including a first terminal (or "line terminal" or "busbar terminal") that electrically connects to a busbar and a second terminal (or "branch circuit terminal" or "load terminal"). The controlled circuit breakers 108 may include switching circuitry that is operable to electrically connect or electrically disconnect the first terminal from the second terminal. The switching circuitry may comprise mechanical components, relays, solid state devices, and so forth. For example, the switching circuitry may be operated to electrically disconnect or de-energize the second terminal, or may be operated to electrically connect or energize the second terminal. The controlled circuit breaker 108 may have other terminals with corresponding connections to a neutral, electrical ground, and so forth.

In some implementations, an instrument device 130 may be installed at the distribution panelboard 104. For example, the controlled circuit breaker 108 may include an instrument device 130, the instrument device 130 may comprise a separate unit installed at the distribution panelboard 104, and so forth.

An electrical branch circuit 110 is connected to the second terminal of the controlled circuit breaker 108. One or more loads may be connected to the electrical branch circuit 110. These loads may comprise monitored devices 112. Each monitored device 112 comprises an instrument device 130, discussed below. The monitored devices 112 may include, but are not limited to, receptacles 114, junction boxes 116, switches 118, light fixtures, or other loads that are directly wired via a load wiring box 120 to the electrical branch circuit 110. For example, the switches 118 may comprise one or more of a single pole single throw (SPST) switch, a double pole double throw switch (DPDT), and so forth. In some situations, the branch circuit may have a single load, such as a microwave oven. In other situations, the electrical branch circuit 110 may have more than one load.

The instrument device 130 may comprise one or more processors 132, communication interfaces 134, sensors 136, signal circuitry 138, output devices 140, and so forth. The instrument device 130 is discussed in more detail with regard to FIGS. 5-7. In brief, the processors 132 may use the sensors 136 to acquire sensor data. The sensors 136 may include one or more of photoresistors 136(1), infrared sensors 136(2), temperature sensors 136(3), humidity sensors 136(4), acoustic sensors 136(5), radio frequency sensors 136(6), vibration sensors 136(7), electrical sensors 136(8), chemical sensors 136(9), or other sensors 136(S). The sensors 136 may be used to acquire information about phenomena associated with failures of the monitored device 112. For example, a photoresistor 136(1) may acquire sensor data indicative of a flash of light generated by an electrical arc, the acoustic sensors 136(5) may acquire sensor data indicative of a sound generated by the electrical arc. The sensor data is processed to determine device data 162 such as an arc count indicative of a count of electrical arcs detected. The device data 162 may be processed to determine status data 164. For example, the device data 162 may be compared to one or more threshold values to determine status data 164 indicative of a status, such as "non-fault", "warning fault", "critical fault" and so forth. Based on the device data 162, one or more output devices 140 such as a light or buzzer may be operated to annunciate the status. The communication interface 134 may be used to send one or more of the device data 162 or the status data 164 to another device, such as a computing device 160.

The computing device 160 is in communication with one or more of the instrument devices 130 of the monitored devices 112, devices at the distribution panelboard 104 such as the controlled circuit breaker 108, and so forth. For example, the computing device 160 and the instrument devices 130 may communicate using a local area network. This may be a wired or wireless local area network. For example, a wireless access point 150 may be used to facilitate communication between the computing device 160 and other devices such as the instrument devices 130, user devices 152, and so forth.

The computing device 160 may be a standalone device as shown here. In other implementations, the computing device 160 may be installed at the distribution panelboard 104. In still other implementations, the computing device 160 may be a shared computing device, such as a server that is either local or accessed via a wide area network, such as the Internet.

The computing device 160 may execute a monitor module 166. Operation of the monitor module 166 is discussed in more detail below. In brief, the monitor module 166 may accept as input one or more of the device data 162 or the status data 164. For example, the instrument device 130 may send device data 162, and the monitor module 166 may determine the status data 164 based at least in part on a comparison between the status data 164 and threshold data 168. In another example, the instrument device 130 may determine the status data 164 and send the status data 164 to the monitor module 166.

The monitor module 166 may use the status data 164 to determine one or more of control data 170 or notification data 172. The control data 170 may comprise instructions or other information that directs operation of one or more other devices. For example, the control data 170 may comprise instructions sent to a controlled circuit breaker 108 that directs the switching circuitry therein to disconnect the second terminal from the third terminal, de-energizing the electrical branch circuit 110.

The notification data 172 may comprise information indicative of status of at least a portion of the system 100. The notification data 172 may be used to present output 154. For example, the notification data 172 may indicate that receptacle 114(1) has experienced a "warning fault" at a specified time. The notification data 172 may be used to present a user interface that conveys this information. For example, the notification data 172 may comprise instructions to operate a network enabled speaker to provide audio output such as synthesized speech announcing, "a receptacle in the living room is having a problem". As described above, the instrument device 130 may also use an output device 140 to provide output 154, such as illuminating a light, operating a buzzer, and so forth.

Figure 2:
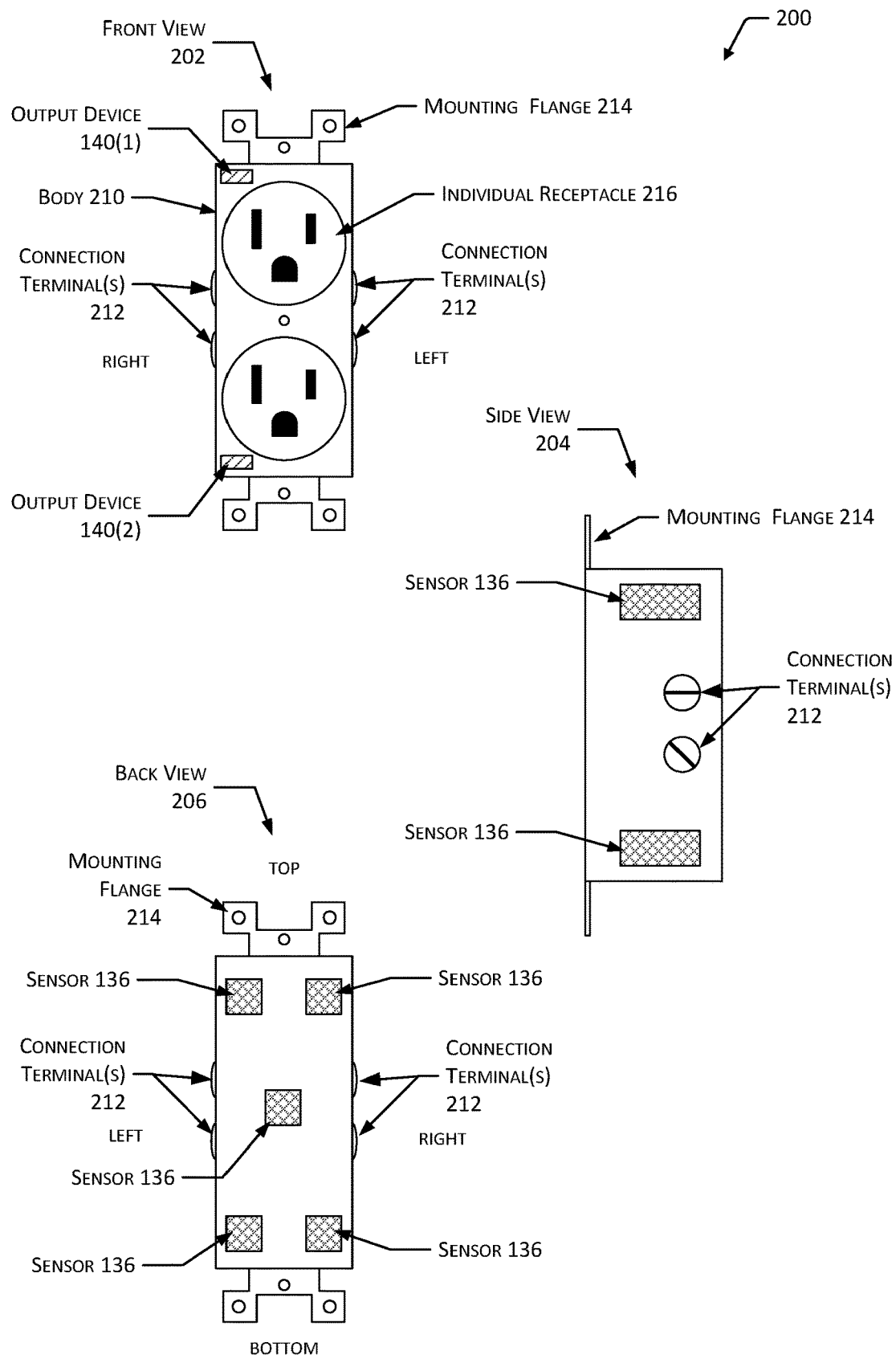
FIG. 2 illustrates an electrical receptacle with an integrated instrument device, according to some implementations.

FIG. 2 illustrates at 200 an electrical receptacle 114 with an integrated instrument device 130, according to some implementations. Depicted are a front view 202, a side view 204, and a back view 206. The receptacle 114 comprises a body 210 and a pair of individual receptacles 216. For example, an individual receptacle 216 for use in the United States may be compliant with the National Electrical Manufacturers Association (NEMA) 5-15R specification. Connection terminals 212 are depicted. In this illustration, screw terminals are shown by way of illustration and not as a limitation. For example, push terminals may be used. The connection terminals 212 connect the receptacle 114 to the electrical branch circuit 110, that may in turn be connected to the controlled circuit breaker 108, that is connected to the bulbar energized by the mains 102. The connection terminals 212 may also serve to facilitate serial installation of the electrical branch circuit 110, or "daisy chaining", eliminating the need for separate wiring connectors and pigtails.

Also shown are mounting flanges 214 that are used to retain the receptacle 114 within a mounting box or other structure.

The receptacle 114 may include one or more output devices 140 located on a front of the body 210. The output devices 140 may be operated by the instrument device 130 integrated within the receptacle 114. For example, the output devices 140 may comprise lights that illuminate or change color to indicate the status of the receptacle 114. In another example, the output devices 140 may comprise a buzzer, speaker, or other audio output device. Other output devices 140 may be arranged at the front, or at other locations with respect to the body 210.

One or more sensors 136 may be placed at various locations with respect to the body 210. For example, sensors 136 are depicted on the sides and the back of the receptacle 114. The sensors 136 may be arranged to provide an array of two or more sensors 136. For example, two photoresistors 136(1) may be arranged on each side of the body 210, a first above the connection terminals 212 and a second below. In another example, five photoresistors 136(1) may be mounted in an approximate quincunx pattern on the back of the body 210, as shown.

The spatial separation of the sensors 136 may be used to provide information as to where a fault occurred. For example, assume the receptacle 114 has a "hot" wire connected to the electrical branch circuit 110 using the connection terminals 212 on the left side, and a "neutral" wire connected to the electrical branch circuit 110 using the connection terminals 212 on the right side. Continuing the example, if an arc occurs at the connection terminal 212 on the right side involving the neutral line, the photoresistors 136(1) on the right side will detect a greater amplitude of light than the photoresistors 136(1) on the left side. This difference in amplitude thus provides an indication as to where the arc occurred. In other implementations this spatial resolution may not be used. For example, a single photoresistor 136(1) may be positioned on the back of the body 210, and may include a lens, lightguide, or other optical device to acquire light from different directions.

Different types of sensors 136 may be disposed on the body 210 or therein. For example, the left side and the right side may each have a single photoresistor 136(1) and a single infrared sensor 136(2). Continuing the example, a temperature sensor 136(3) and a single humidity sensor 136(4) may be located on the back of the body 210.

The various sensors 136 and arrangements discussed may be implemented with respect to other monitored devices 112. For example, an instrument device 130 and various sensors 136 may be integrated into a switch 118. In another example, the instrument device 130 may be incorporated into, or placed within, a junction box 116 with a terminal block or splices, load wiring box 120, and so forth.

During operation, the instrument device 130 or at least the optical sensors 136 associated with the instrument device 130 may be shielded from ambient light. For example, the electrical outlet faceplate, outlet box, and so forth may be optically opaque. In other implementations, the optical sensors 136 may dynamically adjust their respective threshold values to account for light leakage that impinges on the optical sensors 136.

Figure 3:
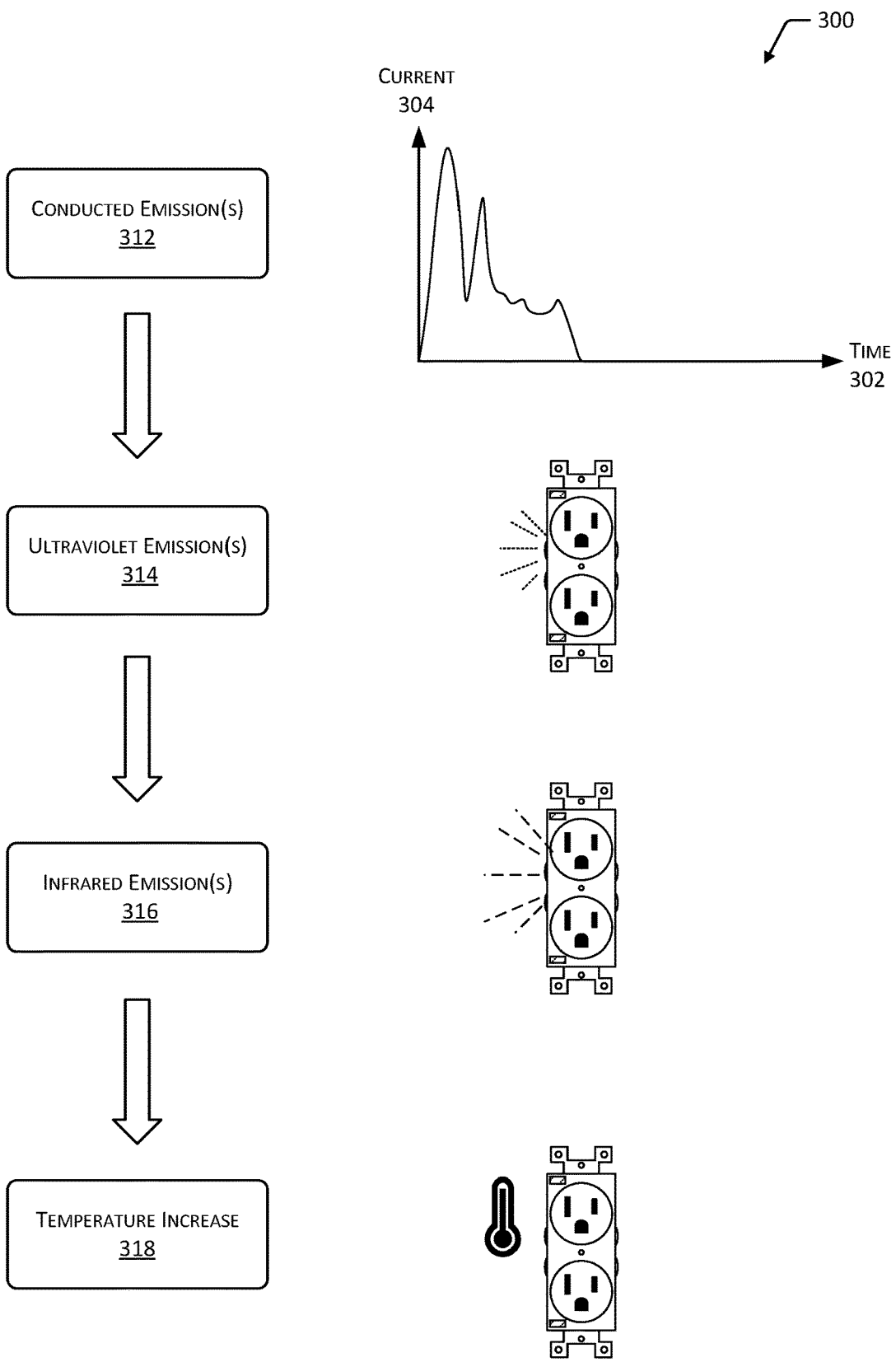
FIG. 3 illustrates phenomenological progression of an arc fault, according to one implementation.

FIG. 3 illustrates at 300 phenomenological progression of an arc fault, according to one implementation. In this illustration, time generally increases down the page. Some or all of these phenomenological occurrences may overlap with one another. Arcs may "start small and grow". A space of a fraction of a millimeter between the connection terminal 212 and a wire may be sufficient to enable arcing. Other factors, such as the geometry of the surfaces also contribute to arcing. For example, sharp edges of an electrical conductor are more prone to arcing than a rounded surface. As arcing continues, contaminants may be carbonized, materials may become ionized, and the arc may develop into a fire.

At a first time conducted emissions 312 are observed as the arc begins. For example, a sudden spike in electrical current may occur. This is illustrated with a graph in which time 302 is depicted as increased along a horizontal axis while current 304 is depicted on a vertical axis.

At a second time ultraviolet emissions 314 are observed. As the arc progresses, the arc emits photons in the form of ultraviolet light are emitted.

At a third time infrared emissions 316 are observed. The arc has developed, and now relatively lower energy photons may be emitted by the arc. As mentioned above, phenomenological occurrences may overlap. For example, ultraviolet and infrared emissions may be contemporaneous during at least a portion of the arc.

At a fourth time a bulk temperature increase 318 is observed. The energy released by the arc process has now increased the bulk temperature of the surrounding materials.

The sensors 136 are able to observe the phenomena and provide sensor data. By using sensor data from different sensors 136 that monitor different phenomenological occurrences, accuracy of the arc detection is substantially improved.

Figure 4:
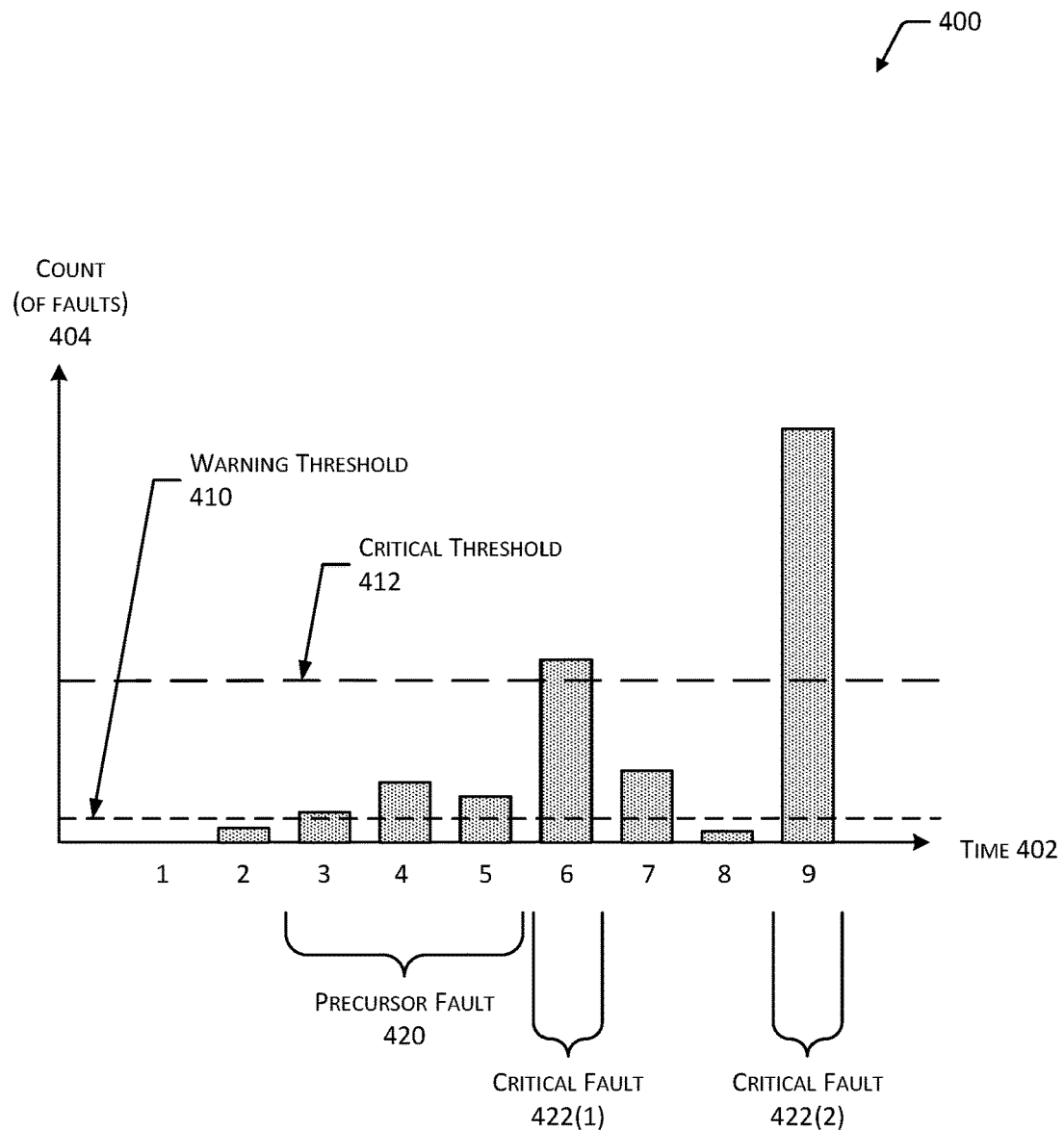
FIG. 4 illustrates a graph of faults over time, according to some implementations.

FIG. 4 illustrates a graph 400 of faults over time, according to some implementations. In this illustration, time 402 is depicted as increased along a horizontal axis while a count 404 of faults is depicted on a vertical axis.

As described in the following figures, the system 100 may determine status data 164 based on sensor data acquired over time. This status data 164 may be indicative of various states, such as precursor faults 420 or critical faults 424. For example, precursor faults 420 may comprise small electrical arcs that occur occasionally. In comparison, a critical fault 422 may comprise a fault that is deemed an imminent danger.

A warning threshold 410 is specified with respect to a first count 404, while a critical threshold 412 is specified with respect to a second count 404 that is greater than the first count 404. In this illustration, several precursor faults 420 occur during times 3-5. As a result of the precursor faults 420 exceeding the warning threshold 410 a notification may be provided. For example, the output device 140 of the instrument device 130 may be activated to illuminate an amber or cautionary light. In another example, the monitor module 166 may issue notification data 172, such as sending a text message to the user that indicates the particular instrument device 130 and nature of the failure.

A critical fault 422(1) occurs at time 6. As a result of the critical fault 422(1) exceeding the critical threshold 412, a notification may be provided. For example, the output device 140 of the instrument device 130 may be activated to illuminate a red or danger light. In another example, the monitor module 166 may issue notification data 172, such as sending a text message to the user that indicates the particular instrument device 130 and nature of the failure.

As described below in more detail, other mitigating actions may also be taken by the system 100. For example, responsive to one or more of a precursor fault 420 or a critical fault 422, or some threshold thereof, the controlled circuit breaker 108 may be operated to disconnect the electrical branch circuit 110, de-energizing the electrical branch circuit 110 connected to the instrument device 130.

Figure 5:
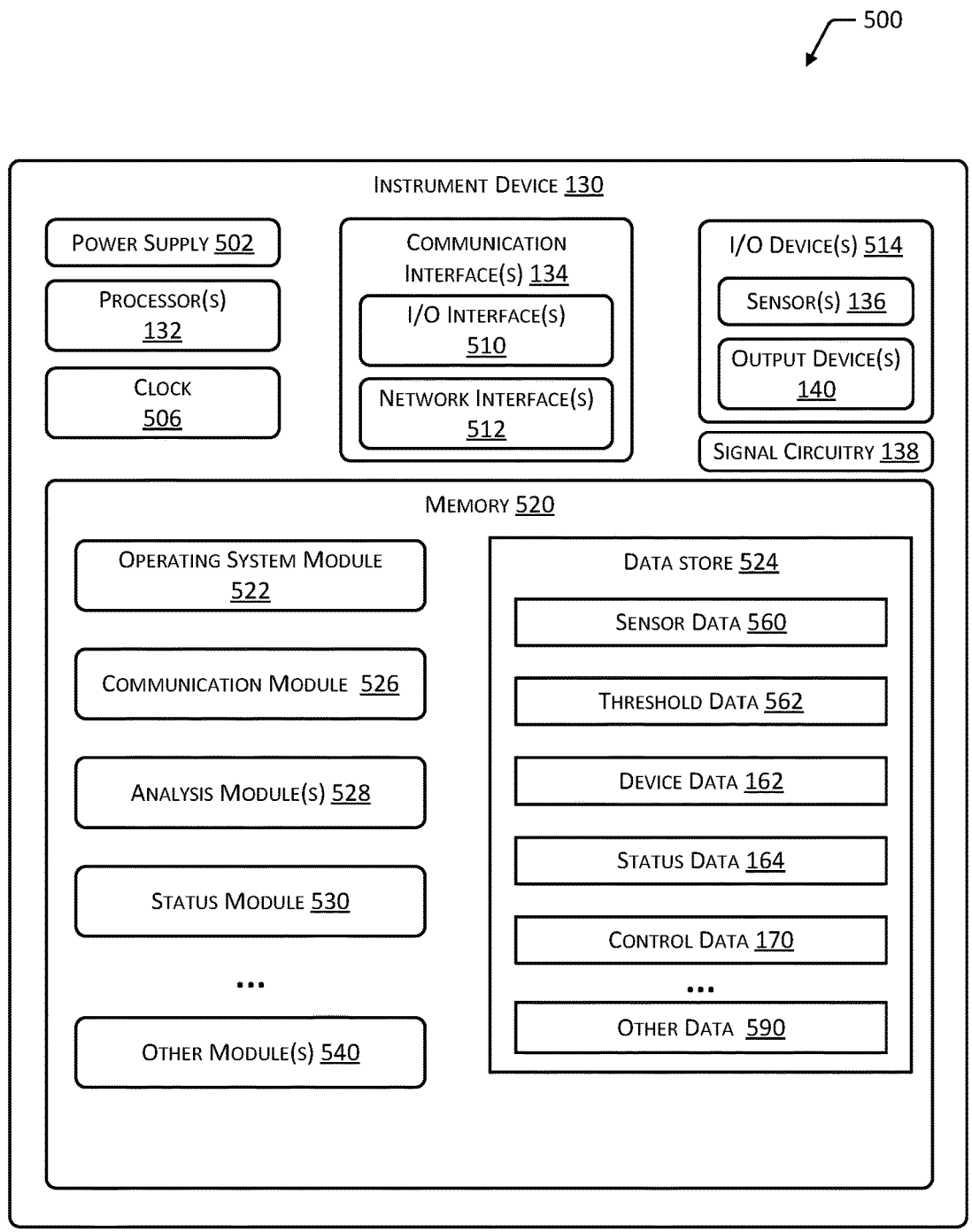
FIG. 5 is a block diagram of an instrument device, according to some implementations.

FIG. 5 is a block diagram 500 of an instrument device 130, according to some implementations. The instrument device 130 may be implemented as one or more of an embedded system, system on a chip, discrete circuitry, and so forth.

One or more power supplies 502 may be configured to provide electrical power suitable for operating the components in the instrument device 130. The one or more power supplies 502 may comprise capacitors, batteries, connections to the electrical branch circuit 110, and so forth. In some implementations, the power supply 502 may be configured to provide electrical power to the instrument device 130 after the electrical branch circuit 110 is no longer energized. For example, the power supply 502 may include capacitors to provide electrical power for the instrument device 130 to send one or more of device data 162, status data 164, or another message or signal to another device.

The instrument device 130 may include one or more hardware processors 132 (processors) configured to execute one or more stored instructions. For example, the hardware processors 132 may include application specific integrated circuits (ASICs), field-programmable gate arrays (FPGAs), digital signal processors (DSPs), and so forth. The processors 132 may comprise one or more cores. One or more clocks 506 may provide information indicative of date, time, ticks, and so forth.

The instrument device 130 may include one or more communication interfaces 134 such as input/output (I/O) interfaces 510, network interfaces 512, and so forth. The communication interfaces 134 enable the instrument device 130, or components thereof, to communicate with other devices or components. The communication interfaces 134 may include one or more I/O interfaces 510. The I/O interfaces 510 may comprise Inter-Integrated Circuit (I2C), Serial Peripheral Interface bus (SPI), Universal Serial Bus (USB) as promulgated by the USB Implementers Forum, RS-232, Peripheral Component Interconnect (PCI), and so forth.

The I/O interface(s) 510 may couple to one or more I/O devices 514. The I/O devices 514 may include input devices such as one or more of a sensor 136, button, and so forth. Operation of the one or more sensors 136 may utilize the signal circuitry 138 as discussed in FIG. 6. The I/O devices 514 may also include output devices 140 such as one or more of a display device, printer, audio speakers, and so forth. In some embodiments, the I/O devices 514 may be physically incorporated with the instrument device 130 or may be externally placed.

The network interfaces 512 may be configured to provide communications between the instrument device 130 and other devices, such as routers, wireless access points 150, and so forth. The network interfaces 512 may include devices configured to couple to personal area networks (PANS), local area networks (LANs), powerline communication networks (PCNs), wireless local area networks (WLANS), wide area networks (WANs), and so forth. For example, the network interfaces 512 may include devices compatible with Ethernet, Wi-Fi, Bluetooth, IEEE 1901 standard, X10, and so forth.

The instrument device 130 may also include one or more buses or other internal communications hardware or software that allow for the transfer of data between the various modules and components of the instrument device 130.

As shown in FIG. 5, the instrument device 130 includes one or more memories 520. The memory 520 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 520 provides storage of computer-readable instructions, data structures, program modules, and other data for the operation of the instrument device 130. Some functional modules are shown stored in the memory 520, although the same functionality may alternatively be implemented in hardware, firmware, as a system on a chip (SoC), dedicated circuitry, and so forth.

The memory 520 may include at least one operating system (OS) module 522. The OS module 522 is configured to manage hardware resource devices such as the I/O interfaces 510, the I/O devices 514, the communication interfaces 134, and provide various services to applications or modules executing on the processors 132. The OS module 522 may implement a variant of the FreeBSD operating system as promulgated by the FreeBSD Project; other UNIX or UNIX-like variants; a variation of the Linux operating system as promulgated by Linus Torvalds; FreeRTOS; Zephyr; VxWorks; and so forth.

Also stored in the memory 520 may be a data store 524 and one or more of the following modules. For example, these modules may be executed as foreground applications, background tasks, daemons, and so forth. The data store 524 may use a flat file, database, linked list, tree, executable code, script, or other data structure to store information. In some implementations, the data store 524 or a portion of the data store 524 may be distributed across one or more other devices including other instrument devices 130, network attached storage devices, and so forth.

The data store 524 may store one or more of sensor data 560, threshold data 562, device data 162, status data 164, control data 170, or other data 590. The sensor data 560 may be acquired using one or more of the sensors 136 or other devices. For example, in some implementations the network interfaces 512 may be used to acquire sensor data 560. Operation of the sensors 136 and acquisition of sensor data 560 is discussed in more detail with respect to FIG. 6.

A communication module 526 may be configured to establish communications with other devices, such as other instrument devices 130, one or more controlled circuit breakers 108, the computing device 160, and so forth. The communications may be authenticated, encrypted, and so forth.

The memory 520 may also store an analysis module 528 and a status module 530. The analysis module 528 may process sensor data 560 to determine the device data 162. The device data 162 may then be processed by the status module 530 to determine the status data 164. In some implementations, one or more of the analysis module 528 or the status module 530 may use the threshold data 562 during operation. The analysis module 528 and the status module 530 are discussed in more detail with respect to FIG. 7.

Other modules 540 may also be present in the memory 520 as well as other data 590 in the data store 524.

Figure 6:
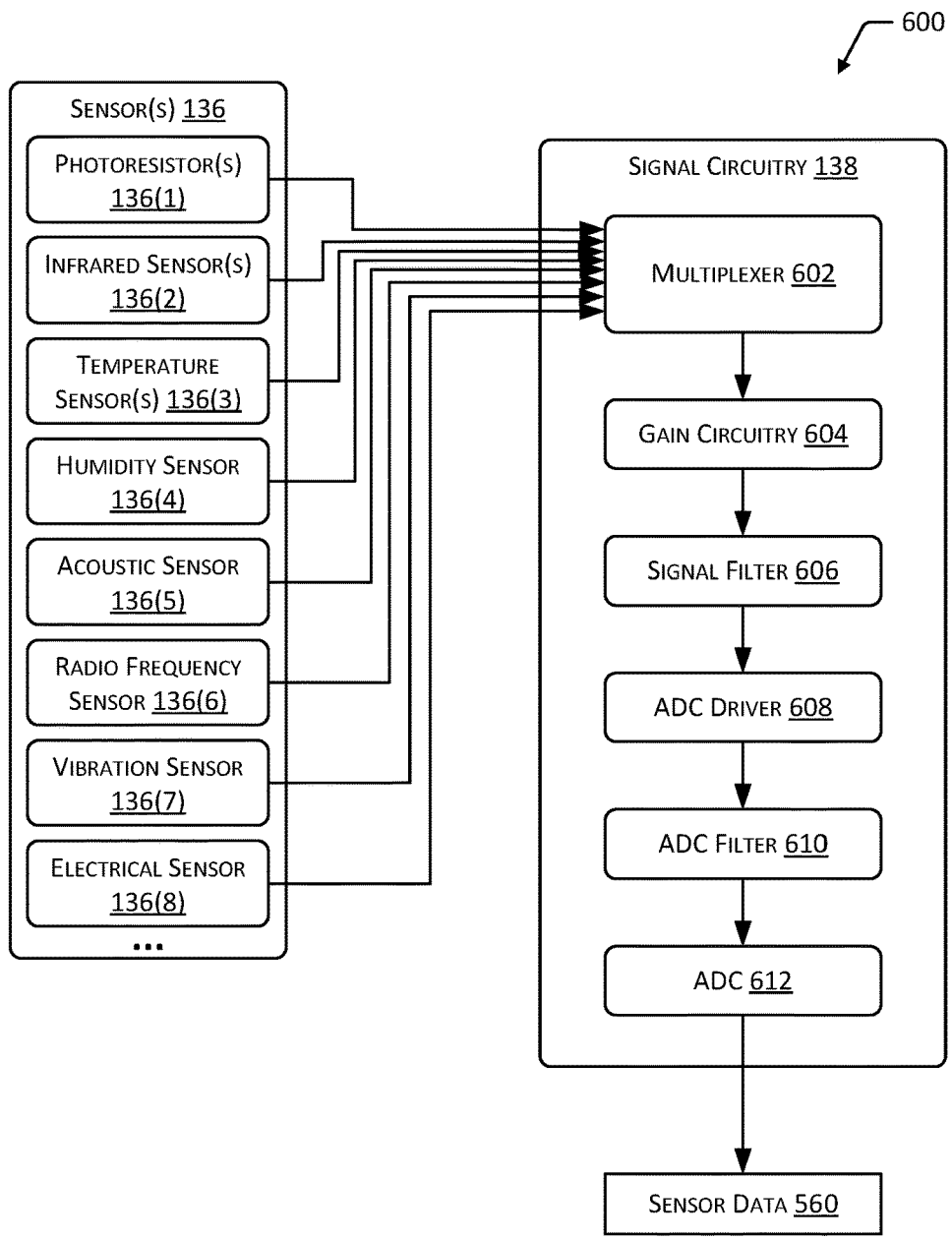
FIG. 6 is a block diagram of signal circuitry of the instrument device, according to some implementations.

FIG. 6 is a block diagram 600 of the sensors 136 and the signal circuitry 138 of the instrument device 130, according to some implementations. The instrument device 130 may include, or be in communication with, one or more sensors 136.

The sensors 136 may include one or more of photoresistors 136(1). In some implementations, photoresistors 136, photodetectors, or other photosensitive devices may be used that are responsive to different wavelengths. These wavelengths may include, but are not limited to, infrared, visible, or ultraviolet light. The photoresistors 136(1) may be operated in conjunction with optical filters. For example, an optical bandpass filter may be used to limit the wavelengths of light impinging upon the active portion of the photoresistors 136(1).

The sensors 136 may include one or more infrared sensors 136(2). The infrared sensors 136(2) may comprise passive infrared sensors that are responsive to different wavelengths. These wavelengths may include, but are not limited to far infrared, mid infrared, or near infrared. The infrared sensors 136(2) may be operated in conjunction with optical filters. For example, an optical bandpass filter may be used to limit the wavelengths of light impinging upon the active portion of the infrared sensor 136(2).

The sensors 136 may include one or more temperature sensors 136(3). The temperature sensors 136(3) may comprise thermocouples, silicon bandgap temperature sensors, and so forth. The temperature sensors 136(3) may provide an indication of bulk temperature of the instrument device 130, other portions of the monitored device 112, the surrounding environment, and so forth.

The sensors 136 may include one or more humidity sensors 136(4). The humidity sensors 136(4) may be configured to determine ambient relative humidity. For example, the humidity sensors 136(4) may comprise capacitive, resistive, optical, or other elements.

The sensors 136 may include one or more acoustic sensors 136(5). For example, the acoustic sensors 136(5) may comprise one or more microphones.

The sensors 136 may include one or more radio frequency (RF) sensors 136(6). For example, the RF sensors 136(6) may comprise a high frequency radio receiver that acquires radio frequency data. For example the radio frequency data may comprise samples indicative of signal amplitudes at a plurality of frequencies, across a specified frequency range, and so forth. Arcing may result in RF noise or signals that are detectable by the RF sensors 136(6). In some implementations, one or more portions of the communication interfaces 134 may be used as the RF sensor 136(6). For example, a receiver of a WiFi radio or a powerline communication device may be used to acquire the radio frequency data.

The sensors 136 may include one or more vibration sensors 136(7). The vibration sensors 136(7) may comprise microelectromechanical devices, pyrometers, accelerometers, and so forth. The vibration sensors 136(7) may provide as output vibration data. The vibration data may be indicative of mechanical or physical movement. For example, during arcing mechanical displacement may occur due to interaction between the arc phenomena and the monitored device 112. This mechanical displacement may be represented in the vibration data. In some situations the vibration data acquired by the vibration sensors 136(7) may be used to determine a physical event that induces arcing. For example, the mechanical vibration caused by a user manually inserting or removing a plug from an individual receptacle 216 may be detected.

The sensors 136 may include one or more electrical sensors 136(8). The electrical sensors 136(8) may comprise circuitry to measure one or more of voltage, current, frequency, and so forth. For example, the electrical sensors 136(6) may comprise a voltage sensor, current sensor such as a Hall effect device, frequency sensor, and so forth.

The sensors 136 may include one or more chemical sensors 136(9). The chemical sensors 136(9) may comprise circuitry and devices to detect the presence of one or more chemical compounds. In some implementations the chemical sensors 136(9) may provide information indicative of concentration. The chemical sensors 136(9) may detect compounds such as one or more of ozone, radon, carbon monoxide, carbon dioxide, hydrocarbons such as natural gas, and so forth. For example, the chemical sensors 136(9) may detect products created during combustion, decomposition, and so forth.

The sensors 136 may include, or have one or more of the other sensors 136 operate as, a smoke detector. For example, the sensors 136 may include a photoelectric smoke detector, ionization smoke detector, and so forth.

The sensors 136 may be connected to the signal circuitry 138. The signal circuitry 138 may comprise a multiplexer 602. At a specified time, the multiplexer 602 connects a particular sensor 136 to gain circuitry 604. The gain circuitry 604 may comprise an operational amplifier ("op amp"). Output from the gain circuitry 604 may be passed to a signal filter 606. For example, the signal filter 604 may comprise one or more resistors or capacitors.

Output from the signal filter 606 is provided to an analog to digital (ADC) driver 608. The ADC driver 608 may comprise an amplifier and circuitry to perform various functions such as buffering, amplitude scaling, offset adjustments, and so forth. Output from the ADC driver 608 may be passed to an ADC filter 610. The ADC filter 610 may comprise one or more resistors or capacitors. Output from the ADC filter 610 may be passed to an ADC 612.

The ADC 612 provides as output the sensor data 560 comprising digital information indicative of the phenomena detected by the sensor 136.

The signal circuitry 138 may be operated to acquire sensor data 560 at a specified data acquisition frequency. Different sensors 136 may be operated at different data acquisition frequencies. For example, the signal circuitry 138 may operate the electrical sensor(s) 136(8) to operate and collect 22,000 samples per second while the photoresistors 136(1), infrared sensors 136(2), temperature sensors 136(3), humidity sensor 136(5), and so forth are operated to acquire 5,000 samples per second of sensor data 560. The bit-depth of the respective sensor data 560 acquired may vary between sensors 136. For example, the signal circuitry 138 may acquire sensor data 560 using the humidity sensor 136(4) with a bit-depth of 8 bits, while the sensor data 560 acquired using the electrical sensor 136(8) have bit-depth of 16 bits.

In other implementations other signal circuitry 138 configurations may be used.

Figure 7:
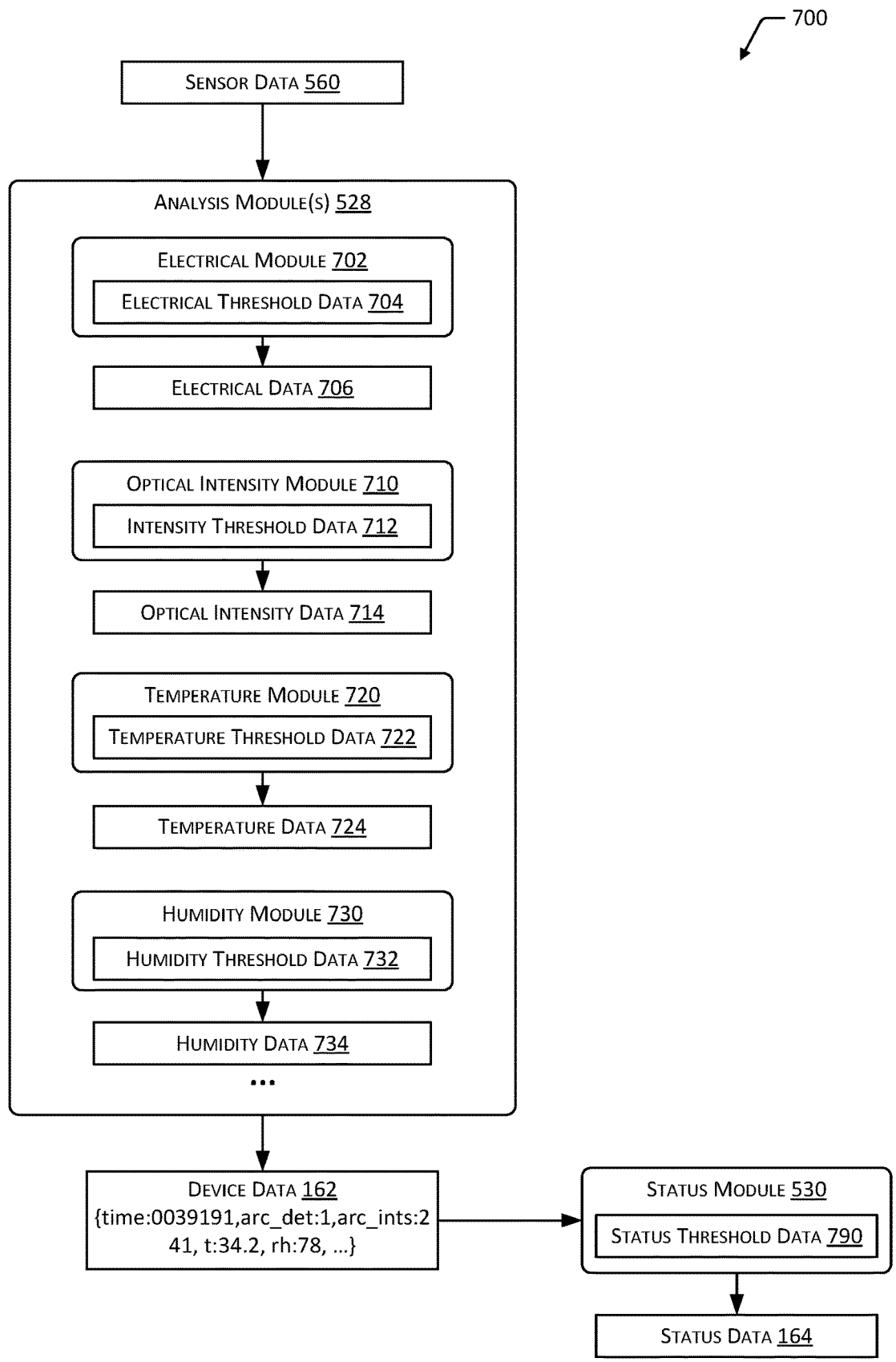
FIG. 7 is a block diagram of processing sensor data to determine status data, according to some implementations.

FIG. 7 is a block diagram 700 of processing sensor data 560 to determine status data 164, according to some implementations. The processing may be performed by one or more of the processors 132, computing device 160, and so forth.

The analysis module 528 receives the sensor data 560 and processes it with one or more modules. For example, the modules may include one or more of an electrical module 702, optical intensity module 710, temperature module 720, humidity module 730, and so forth. Each of the modules may use sensor data 560 from one or more sensors 136.

The device data 162 may be associated with a specified time interval. The cadence at which device data 162 is determined (or data acquisition frequency) may be based on the frequency of the AC waveform.

The electrical module 702 may use data acquired by the electrical sensor 136(8) to determine electrical data 706. For example, the electrical sensor 136(8) may report a signal indicative of voltage of the electrical branch circuit 110, electrical current, and so forth. The electrical module 702 may provide information for individual receptacles 216, combined for all individual receptacles 216, passed through to a downstream device in a serial connection, and so forth.

The electrical module 702 may compare sensor data 560 to electrical threshold data 704 to determine electrical data 706. If the value of sensor data 560 exceeds a threshold value, then an arc may be deemed to have occurred and subsequently is indicated by the electrical data 706. In some implementations, the electrical threshold data 704 may specify a threshold current value. If the current value as indicated by the sensor data 560 exceeds the threshold current value, then an arc event may be deemed to have occurred. In another implementation, the electrical module 702 may determine an arc has occurred based on a discontinuity in the waveform of the AC power.

The optical intensity module 710 may compare sensor data 560 to intensity threshold data 712 to determine optical intensity data 714. For example, the intensity threshold data 712 may specify a set of ranges of intensity of light indicated by the photoresistor 136(1), set of ranges of intensity of light indicated by the infrared sensor 136(2), and so forth. Each range may be associated with a particular intensity value. For example, a lookup table may be used to relate a first value of sensor data 560 associated with the photoresistor 136(1) and a second value of sensor data 560 associated with the infrared sensor 136(2) to determine a particular value of optical intensity data 714.

In one implementation, the optical intensity module 710 may process sensor data 560 from a plurality of optical sensors 136 that are responsive to different wavelengths. For example, the optical intensity module 710 may accept input from photoresistors 136(1) that are sensitive to ultraviolet light, infrared sensors 136(2) sensitive to infrared light, and so forth. In another implementation, different optical intensity modules 710 may be used, with each processing sensor data 560 associated with a different range of wavelengths, such as ultraviolet, infrared, and so forth.

The optical intensity module 710 may use one or more fixed thresholds, or a dynamically adjustable threshold. The enclosure surrounding the sensors 136 may be opaque, presenting external light from impinging thereon. In some implementations, ambient light leakage may be compensated for by either setting a fixed threshold value or by dynamically adjusting the threshold value.

The temperature module 720 may compare sensor data 560 acquired by the temperature sensor 136(3) to temperature threshold data 722 to determine temperature data 724. For example, the temperature threshold data 722 may specify a maximum permitted temperature. If the sensor data 560 indicates that a temperature has been detected that is greater than the maximum permitted temperature, the temperature data 724 may be indicative of this. In some implementations, the temperature threshold data 722 may be determined based on the materials associated with the monitored devices 112. For example, the temperature threshold data 722 may be determined based on flashpoints for building materials, insulation, materials used in the monitored devices 112, and so forth.

The humidity module 730 may compare sensor data 560 acquired by the humidity sensor 136(4) to humidity threshold data 732 to determine humidity data 734. For example, the humidity threshold data 732 may specify a minimum humidity. If the sensor data 560 indicates that humidity has been detected that is greater than the minimum humidity, the humidity data 732 may be indicative of this.

In some implementations, the modules of the analysis module 528 may provide output that is single bit, multiple bit, and so forth. For example, the electrical module 702 may determine electrical data 706 comprising a first single bit value in which "1" indicates "excessive arc counts detected", and "0" indicates "no excessive arc counts detected". In another example, the temperature module 720 may determine temperature data 724 comprising a second single bit value of "1" may indicate "maximum temperature exceeded". Different modules may report different values. For example, the humidity module 730 may report humidity data 734 comprising a single bit indicative of high or low humidity, while the electrical data 706 comprises an 8 bit value.

In some implementations, the modules of the analysis module 528 may reduce data transfer by only reporting data that is out of a specified range, exceeds a threshold value, is less than a threshold value, and so forth. For example, the modules may determine output data in the event of an exceptional condition, and not provide output data if a normal condition is observed.

In some implementations one or more of the thresholds may be determined as part of initial calibration or installation. For example, after installation, the instrument device 130 may acquire sensor data 560 and determine the electrical threshold data 704, intensity threshold data 712, the temperature threshold data 722, and so forth. Continuing the example, sensor data 560 acquired after installation using photoresistors 136(1), infrared sensors 136(2), and so forth may be used to determine respective threshold values for subsequent analysis.

The status module 530 accepts as input the device data 162 and determines status data 164. The status module 530 may use status threshold data 790 specifying one or more threshold values, ranges, and so forth to determine the status data 164. The status module 530 may use various combinations of individual elements of device data 162 to determine the status data 164. The thresholds associated with some statuses may be based on one or more of temperature data 724, humidity data 734, and so forth. Faults such as arcing may be more prone to occurring during particular environmental conditions. For example, the threshold for determining a critical fault 422 may be lower in situations of temperature greater than 35 degrees Centigrade and relative humidity that is greater than 95%. In comparison, the threshold for determining the critical fault 422 may be relatively greater in colder and drier conditions.

In some implementations, the sequence or order in which particular phenomena are observed in the sensor data 560 may be used to determine the status data 164. In one implementation, a fault may be deemed to occur if the phenomenological order depicted with regard to FIG. 3 is observed. For example, a current value associated with a first time exceeds a first threshold value. Next, an ultraviolet intensity value associated with a second time after the first time exceeds a second threshold value. Next, an infrared intensity value associated with a third time after the second time exceeds a third threshold value. Based on this sequence, the status module 530 may determine status data 164 indicative of a fault. In some implementations other phenomena may also be included in the ordered determination. For example, a temperature value associated with a fourth time after the third time that exceeds a fourth threshold value may be used by the status module 530 to determine the status data 164.

The status data 164 may be indicative of specified status types, such as "non-fault", "warning fault", "critical fault" and so forth. Different status types may be indicative of different severity, type of failure, and so forth. For example, the status data 164 may indicate "critical fault hot wire", "warning fault over temperature", and so forth.

The status module 530 may utilize one or more of deterministic analysis algorithms, machine learning systems, and so forth. For example, the status module 530 may utilize one or more classifiers that accept the device data 162 as input and provide as output 154 the status data 164.

Figure 8:
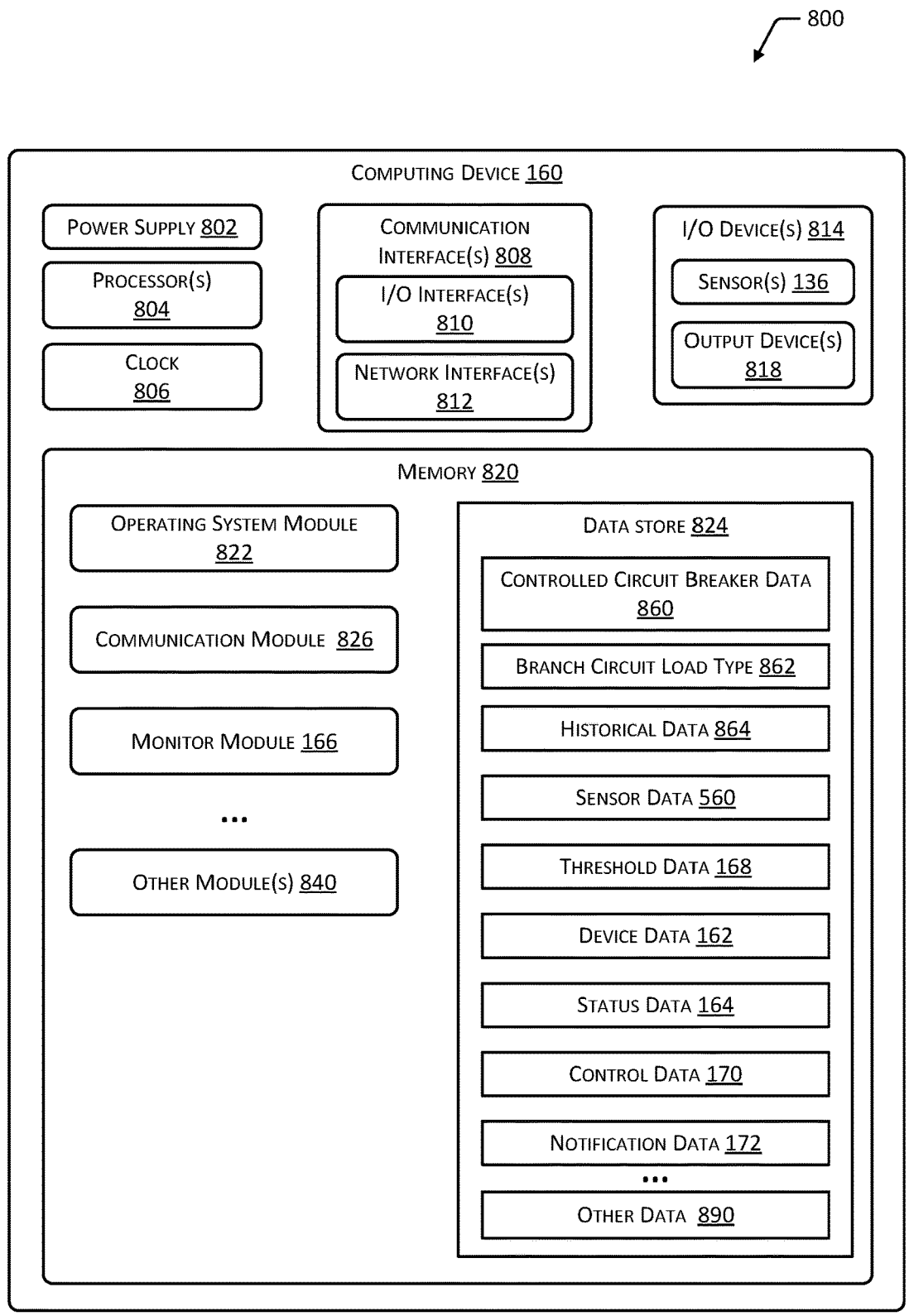
FIG. 8 is a block diagram of a computing device, according to some implementations.

FIG. 8 is a block diagram 800 of the computing device 160, according to some implementations. The computing device 160 may be implemented as one or more of an "embedded system", "on-demand computing", "software as a service (SaaS)", "platform computing", "network-accessible platform", "cloud services", "data centers", and so forth. Services provided by the computing device 160 may be distributed across one or more physical or virtual devices. The computing device 160 may be physically installed on the same premises as the instrument devices 130 being monitored. For example, the computing device 160 may be installed at the distribution panelboard 104. In another example, the computing device 160 may comprise an on-premises server that may provide other services in addition to executing the monitor module 166. In other implementations, the computing device 160 may be located at a different physical location and accessed via a wide area network such as the Internet.

One or more power supplies 802 may be configured to provide electrical power suitable for operating the components in the computing device 160. The one or more power supplies 802 may comprise capacitors, batteries, connections to the bulbar, electrical branch circuits 110, and so forth. In some implementations, the power supply 802 may be configured to provide electrical power to the computing device 160 after external power is no longer available. For example, the power supply 802 may include capacitors to provide electrical power for the computing device 160 to send one or more of status data 164, control data 170, or another message or signal to another device.

The computing device 160 may include one or more hardware processors 804 (processors) configured to execute one or more stored instructions. For example, the hardware processors 804 may include general processor units, ASICs, FPGAs, DSPs, and so forth. The processors 804 may comprise one or more cores. One or more clocks 806 may provide information indicative of date, time, ticks, and so forth.

The computing device 160 may include one or more communication interfaces 808 such as input/output (I/O) interfaces 810, network interfaces 812, and so forth. The communication interfaces 808 enable the computing device 160, or components thereof, to communicate with other devices or components. The communication interfaces 808 may include one or more I/O interfaces 810. The I/O interfaces 810 may comprise I2C, SPI, USB, RS-232, PCI, SATA, and so forth.

The I/O interface(s) 810 may couple to one or more I/O devices 814. The I/O devices 814 may include input devices such as one or more of a sensor 136, keyboard, mouse, scanner, and so forth. The I/O devices 814 may also include output devices 818 such as one or more of a display device, printer, audio speakers, and so forth. The I/O devices 814 may also comprise the output devices 140. In some embodiments, the I/O devices 814 may be physically incorporated with the computing device 160 or may be externally placed.

The network interfaces 812 may be configured to provide communications between the computing device 160 and other devices, such as routers, access points, and so forth. The network interfaces 812 may include devices configured to couple to PANs, LANs, WLANs, WANs, PCNs, and so forth. For example, the network interfaces 812 may include devices compatible with Ethernet, Wi-Fi, Bluetooth, IEEE 1901, X10, and so forth.

The computing device 160 may also include one or more buses or other internal communications hardware or software that allow for the transfer of data between the various modules and components of the computing device 160.

As shown in FIG. 8, the computing device 160 includes one or more memories 820. The memory 820 may comprise one or more non-transitory CRSM. The memory 820 provides storage of computer-readable instructions, data structures, program modules, and other data for the operation of the computing device 160. A few example functional modules are shown stored in the memory 820, although the same functionality may alternatively be implemented in hardware, firmware, as a system on a chip (SoC), dedicated circuitry, and so forth.

The memory 820 may include at least one operating system (OS) module 822. The OS module 822 is configured to manage hardware resource devices such as the I/O interfaces 810, the I/O devices 814, the communication interfaces 808, and provide various services to applications or modules executing on the processors 804. The OS module 822 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; FreeRTOS; Zephyr; VxWorks; and so forth.

Also stored in the memory 820 may be a data store 824 and one or more of the following modules. For example, these modules may be executed as foreground applications, background tasks, daemons, and so forth. The data store 824 may use a flat file, database, linked list, tree, executable code, script, or other data structure to store information. In some implementations, the data store 824 or a portion of the data store 824 may be distributed across one or more other devices including other computing devices 160, network attached storage devices, and so forth.

The data store 824 may store one or more of controlled circuit breaker data 860, branch circuit load type 862, historical data 864, sensor data 560, threshold data 168, device data 162, status data 164, control data 170, notification data 172, or other data 890.

The controlled circuit breaker data 860 may comprise information about one or more of the controlled circuit breakers 108 or other devices that are participating in the system 100. For example, the controlled circuit breaker data 860 may comprise a network address, model number, installation information with respect to the distribution panelboard 104, and so forth. The controlled circuit breaker data 860 may also include data indicative of functionality provided, such as whether the controlled circuit breaker data 860 provides one or more of current-limit protection, AFCI, GFCI, or other functions. The controlled circuit breaker data 860 may also include data indicative of an association between a particular controlled circuit breaker 108 and the instrument devices 130 that are connected to the electrical branch circuit 110 of the controlled circuit breaker 108.

The branch circuit load type 862 may comprise data indicative of the type of loads that are attached to a particular electrical branch circuit 110. For example, the types may include "dedicated appliance—microwave oven", "dedicated appliance—dishwasher", "dedicated appliance—furnace", "room lighting", "room electrical receptacles", "bathroom", "kitchen", "motor", and so forth.

The historical data 864 may comprise previously received or processed information, or summary data based thereon. For example, the historical data 864 may comprise data indicative of a particular instrument device 130 and previous status data 164 associated with that instrument device 130.

In some implementations, the instrument devices 130 may send device data 162 to the computing device 160. The computing device 160 may then include in memory 820 the analysis module(s) 528 and status module 530 or equivalent functionality to determine status data 164.

A communication module 826 may be configured to establish communications with other devices, such as instrument devices 130, one or more controlled circuit breakers 108, other computing devices 160, and so forth. The communications may be authenticated, encrypted, and so forth.

The memory 820 may store the monitor module 166. The monitor module 166 may accept as input the status data 164 associated with one or more instrument devices 130 and determine one or more of control data 170, notification data 172, or other data.

In one implementation, the monitor module 166 may determine one or more of the threshold data 168 to process the device data 162 or the status data 164 based on one or more of the controlled circuit breaker data 860, the branch circuit load type 862, historical data 864, or other data. For example, lower threshold values may be selected from the threshold data 168 for a branch circuit load type 862 of "bathroom" compared to a branch circuit load type 862 of "furnace".

The monitor module 166 may utilize one or more of deterministic analysis algorithms, machine learning systems, and so forth. For example, the monitor module 166 may utilize one or more neural networks that accept the status data 164 and provide as output one or more of control data 170 or notification data 172.

The monitor module 166 may determine and send, using the communication interface(s) 808, the control data 170 to one or more controlled circuit breakers 108, instrument devices 130, or other devices. For example, if the monitor module 166 determines a "critical fault" at an instrument device 130, the monitor module 166 may send control data 170 to the controlled circuit breaker 108 that is on the electrical branch circuit 110 powering the instrument device 130. The control data 170 may operate the controlled circuit breaker 108 to disconnect the electrical branch circuit 110 from the bulbar, de-energizing the electrical branch circuit 110.

The monitor module 166 may determine and send, using the communication interface(s) 808, the notification data 172. For example, the notification data 172 may comprise text, hypertext markup language (HTML) instructions, audio data, image data, and so forth. The notification data 172 may provide information such as the status of a particular instrument device 130, overall status of the system 100, mitigating actions taken such as de-energizing or re-energizing an electrical branch circuit 110, and so forth.

With respect to the instrument device 130, in some implementations, the threshold data 168 used by the analysis module(s) 528 may be set based on one or more of the controlled circuit breaker data 860, the branch circuit load type 862, the historical data 864, or other data. For example, the monitor module 166 may send control data 170 to the instrument device 130 to set one or more of the threshold values or ranges of the analysis module(s) 528 of the instrument device 130.

Other modules 840 may also be present in the memory 820 as well as other data 890 in the data store 824. For example, a web server module may provide a web interface to provide a user interface to allow a user to set thresholds, view current status, configure one or more portions of the system 100, and so forth.

Figure 9:
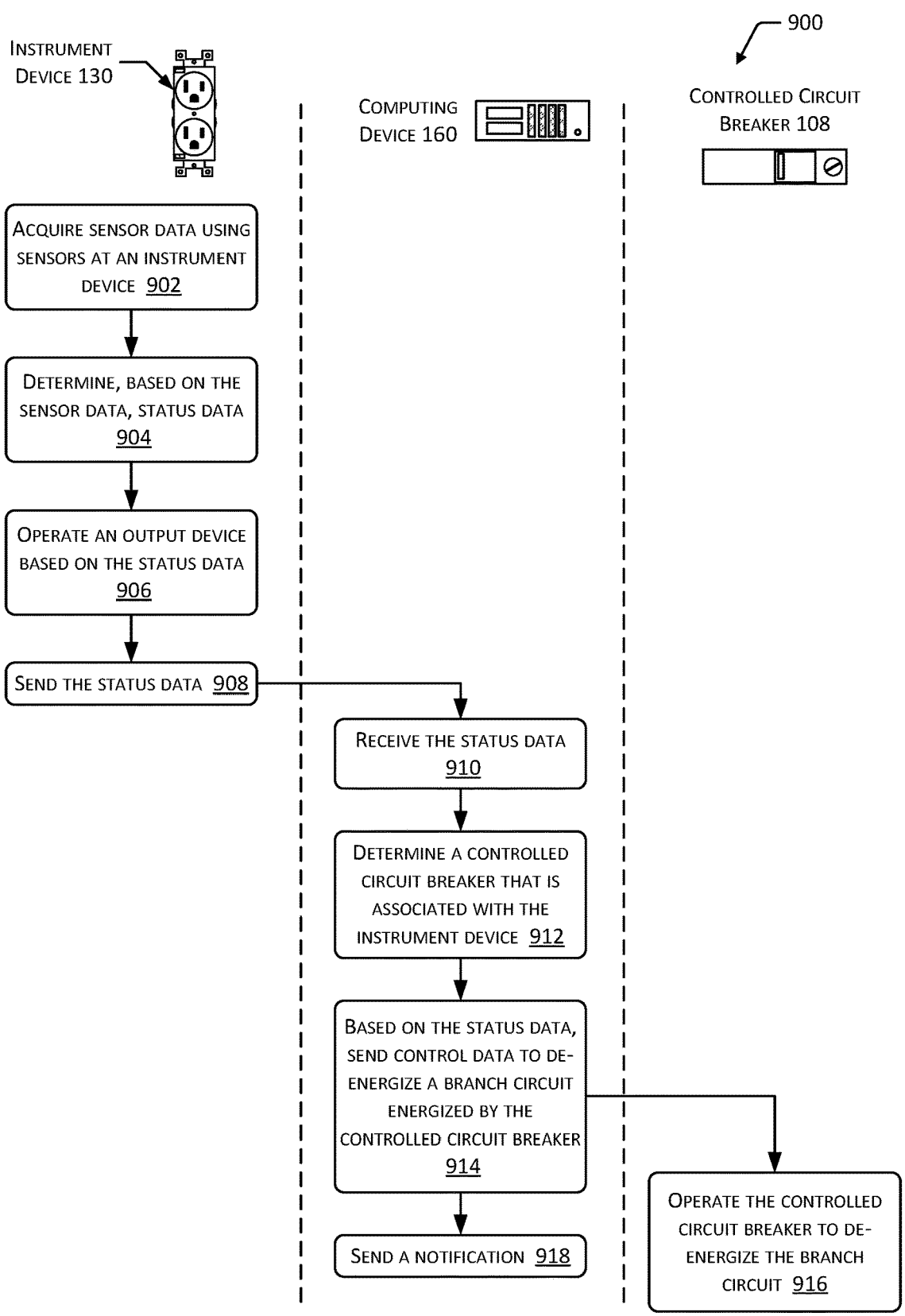
FIG. 9 is a flow diagram of a process to send a notification and operate a controlled circuit breaker based on status data, according to some implementations.

FIG. 9 is a flow diagram 900 of a process to send a notification and operate a controlled circuit breaker 108 based on status data 164, according to some implementations. The process may be implemented by one or more of the instrument device 130, the computing device 160, or the controlled circuit breaker 108. In some implementations, one or more of the steps of the process described may be performed by different devices.

At 902 sensor data 560 is acquired using one or more sensors 136 at the instrument device 130. For example, the signal circuitry 138 may be operated to determine the sensor data 560.

At 904, based on the sensor data 560, status data 164 is determined. For example, the sensor data 560 may be processed by the analysis module(s) 528 as discussed with respect to FIG. 7 to determine device data 162. The device data 162 may then be processed by the status module 530 to determine the status data 164. In another implementation (not shown), the device data 162 may be sent to another device such as the computing device 160 or the controlled circuit breaker 108 for further processing.

At 906 an output device 140 is operated based on the status data 164. For example, if the status data 164 indicates a fault condition, a red light may be illuminated, a buzzer may be activated, and so forth. In some implementations this step may be omitted.

At 908 the status data 164 is sent to the computing device 160. For example, the instrument device 130 may use wireless network interface 512 such as WiFi, or a wired network interface 512 such as a powerline communication (PLC) device to send the status data 164. For example, the WiFi interface may comprise a radio transmitter with an output coupled to an antenna. In another example, the PLC may comprise a transmitter coupled to one or more of the electrical terminals to send a signal along the electrical conductor such as AC wiring.

At 910 the status data 164 is received by the computing device 160.

At 912 a controlled circuit breaker 108 that is associated with the instrument device 130 that sent the status data 908 is determined. For example, the status data 164 may include one or more of a network address associated with the instrument device 130, a device identifier associated with the instrument device 130, a circuit breaker identifier as previously stored by the instrument device 130, and so forth. In one implementation the controlled circuit breaker data 860 is accessed and used to determine the controlled circuit breaker 108 that is servicing the electrical branch circuit 110 to which the instrument device 130 is attached.

At 914, based on the status data 164, control data 170 to deactivate the electrical branch circuit 110 energized by the controlled circuit breaker 108 is determined and sent. For example, the computing device 160 may use the communication interfaces 808 to send the control data 170 to the controlled circuit breaker 108. The computing device 160 may be configured to provide the control data 170 within a threshold length of time, reducing the latency between detection of the potential fault and de-energization of the electrical branch circuit 110.

At 916 the controlled circuit breaker 108 receives the control data 170 and operates the switching circuitry in the controlled circuit breaker 108 to de-energize the electrical branch circuit 110. For example, responsive to the control data 170, the controlled circuit breaker 108 may disconnect the first terminal that is connected to a bulbar from the second terminal that is connected to the electrical branch circuit 110, de-energizing the electrical branch circuit 110.

At 918 the computing device 160 may send notification data 172. For example, a message may be sent to an application executing on a user's smartphone. The message may advise as to the type of the fault and the location on the premises. For example, the message may state "A problem with a receptacle in the living room has been detected. The circuit breaker has been turned off for your safety. Please call an electrician for service."

In some implementations, one or more of the functions associated with the computing device 160 may be performed by the instrument device 130 or the controlled circuit breaker 108. For example, the instrument device 130 may send status data 164 to the controlled circuit breaker 108. The controlled circuit breaker 108 may then determine the false fault and re-energize the electrical branch circuit 110. In another example, the instrument device 130 may determine and send control data 170 to the controlled circuit breaker 108.

Figure 10:
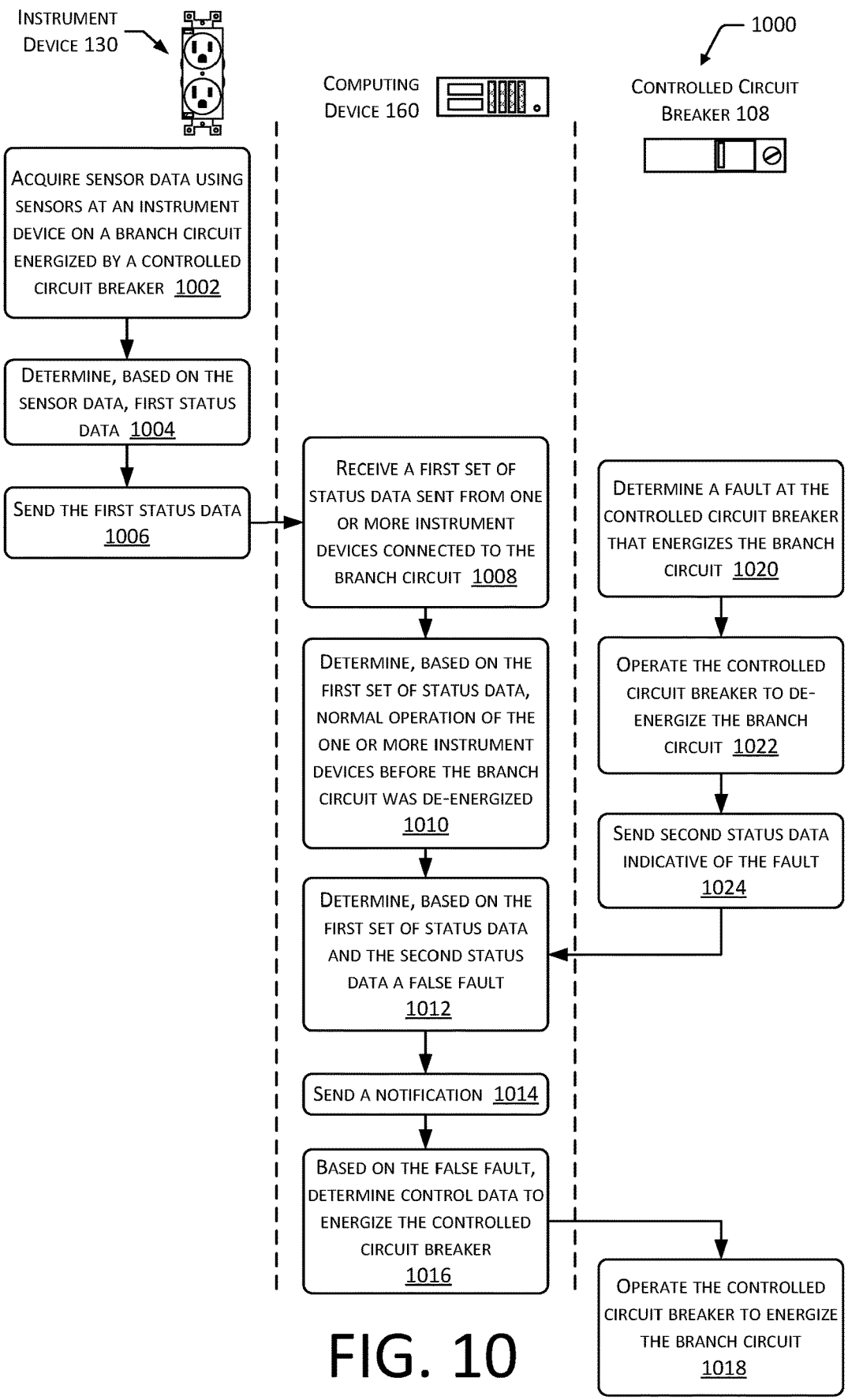
FIG. 10 is a flow diagram of a process to determine a nuisance trip based on status data and operate a controlled circuit breaker to re-energize a branch circuit, according to some implementations.

FIG. 10 is a flow diagram 1000 of a process to determine a nuisance trip based on status data 164 and operate a controlled circuit breaker 108 to re-energize an electrical branch circuit 110, according to some implementations. The process may be implemented by one or more of the instrument device 130, the computing device 160, or the controlled circuit breaker 108. In some implementations, one or more of the steps of the process described may be performed by different devices.

At 1002 sensor data 560 is acquired using one or more sensors 136 at the instrument device 130. For example, the signal circuitry 138 may be operated to determine the sensor data 560. The instrument device 130 is connected to an electrical branch circuit 110 that is energized by a controlled circuit breaker 108.

At 1004, based on the sensor data 560, first status data 164 is determined. For example, the sensor data 560 may be processed by the analysis module(s) 528 as discussed with respect to FIG. 7 to determine device data 162. The device data 162 may then be processed by the status module 530 to determine the first status data 164. In another implementation (not shown), the device data 162 may be sent to another device such as the computing device 160 or the controlled circuit breaker 108 for further processing.

At 1006 the first status data 164 is sent to the computing device 160. For example, the instrument device 130 may use a wireless network interface 512 such as WiFi, or a wired network interface 512 such as a powerline communication (PLC) device to send the first status data 164.

At 1008 a first set of status data sent from one or more instrument devices 130 connected to the electrical branch circuit 110 is received by the computing device 160. For example, the first set of status data may comprise the first status data 164, and if available, status data 164 from the other instrument devices 130 on the same electrical branch circuit 110.

At 1010 based on the first set of status data 164 normal operation of the one or more instrument devices 130 is determined at a first time (before the electrical branch circuit 110 was de-energized).

At 1020 a fault at the controlled circuit breaker 108 that energizes the electrical branch circuit 110 is determined.

At 1022 the controlled circuit breaker 108 is operated at a second time that is after the first time to de-energize the electrical branch circuit 110. For example, the controlled circuit breaker 108 may comprise an AFCI and may trip, operating the switching circuitry to disconnect the first terminal from the second terminal.

At 1024 the controlled circuit breaker 108 sends second status data 164 indicative of the fault to the computing device 160. For example, the controlled circuit breaker 108 may use a communication interface 134 to send the second status data 164 to the computing device 160.

At 1012 based on the first set of status data 164 and the second status data 164, the computing device 160 determines a false fault. For example, if all instrument devices 130 on the electrical branch circuit 110 reports no faults before or during the time associated with the fault indicated by the second status data 164, a false fault be deemed to have occurred. The false fault may comprise a nuisance trip, in which the controlled circuit breaker 108 incorrectly determined a fault condition when none actually was present. For example, an AFCI may experience a nuisance trip due to a particular appliance operating in an expected and safe fashion.

At 1014 the computing device 160 may send notification data 172. For example, a message may be sent to an application executing on a user's smartphone. The message may advise as to the type of the fault and the location on the premises. For example, the message may state "A nuisance trip may have been detected on the microwave oven. Please inspect and click below if you would like to reset the breaker remotely and restore power to the microwave." Data indicative of approval to re-energize may be received responsive to the notification data 172. Continuing the example, the user may provide user input that approves re-energizing the electrical branch circuit 110.

At 1016, based on the false fault, the computing device 160 determines and sends to the controlled circuit breaker 108 the control data 172 to re-energize the electrical branch circuit 110 operated by the controlled circuit breaker 108. The decision to re-energize may be responsive to user input, such as received responsive to the notification sent at 1014. In another implementation the decision to re-energize may be automated and performed without human intervention. The automated determination to operate the controlled circuit breaker 108 to re-energize the electrical branch circuit 110 may be subject to additional criteria, as discussed below.

At 1018 the controlled circuit breaker 108 receives the control data 170 and operates the switching circuitry in the controlled circuit breaker 108 to re-energize the electrical branch circuit 110. For example, responsive to the control data 170, the controlled circuit breaker 108 may connect the first terminal that is connected to a bulbar to the second terminal that is connected to the electrical branch circuit 110, energizing the electrical branch circuit 110.

After re-energizing the branch circuit 108, the system 100 may continue to operate. The thresholds for assessing subsequent sensor data 560 may be varied based on the determination of a false fault. For example, thresholds of the analysis modules 528 or the monitor module 166 may be decreased for a period of time following a false fault. This decrease in threshold may improve safety by reducing the likelihood of an unwanted re-energizing of the electrical branch circuit 110. In another example, if a fault has been detected within a threshold period of time, such as the past 30 days, automatic re-energization may be prohibited and manual intervention by a user may be required.

The combined sensor data 560 acquired by the various sensors 136 of the instrument device 130 provide highly reliable indicia of a fault occurrence. Compared to a traditional AFCI breaker, the instrument device 130 may exhibit improvements of several orders of magnitude in fault detection. For example, where a traditional AFCI breaker may miss detection of an actual arc fault in 1 out of a million occurrences, the systems and techniques described herein reduce the likelihood of a missed detection of an actual arc fault to less than 1 out a billion occurrences.

The computing device 160 may utilize the historical data 864 to further determine false faults. For example, if a particular appliance such as a microwave oven is used at the same times each day, the system 100 may determine this pattern of usage and operate accordingly. Continuing the example, the system 100 may determine a false fault during these times of observed usage, but not during late night hours typically associated with no usage.

In some implementations, the computing device 160 may apply other rules or conditions to the mitigation of a false fault. For example, during specified times of day, such as hours associated with sleeping from 11:00 μm to 7:00 a.m., the computing device 160 may provide a notification only, and leave the electrical branch circuit 110 in a de-energized state.

Information obtained by operation of the system 110 may be used to provide training data or other input to improve operation of other systems. For example, the controlled circuit breaker 108 may utilize a trained machine learning system to attempt to determine occurrence of a fault. The status data 164 indicative of one or more of actual or nuisance faults may be used as training data for further training of the machine learning system. As a result, over time the operation of the controlled circuit breaker 108 may become more accurate.

In some implementations, one or more of the functions associated with the computing device 160 may be performed by the controlled circuit breaker 108. For example, the instrument device 130 may send status data 164 to the controlled circuit breaker 108. The controlled circuit breaker 108 may then determine the false fault and re-energize the electrical branch circuit 110. In another example, the instrument device 130 may determine and send control data 170 to the controlled circuit breaker 108.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a device comprising:
      a first terminal;
      a plurality of sensors comprising a current sensor and one or more optical sensors;
      a first hardware processor to:
         acquire sensor data using the plurality of sensors, wherein the sensor data is indicative of:
            a current value, and
            one or more optical intensity values;
         determine, based on the sensor data, first status data; and
         send the first status data; and
   a circuit breaker comprising:
      a second terminal;
      a third terminal, wherein the third terminal is electrically connected to the first terminal;
      switching circuitry between the second terminal and the third terminal; and
      a second hardware processor to:
         operate, at a first time, the switching circuitry to electrically disconnect the second terminal from the third terminal;
         receive the first status data;
         determine the first status data is indicative of a non-fault condition at the device before the first time; and
         operate, at a second time after the first time, the switching circuitry to electrically connect the second terminal to the third terminal.

2. The system of claim 1, wherein the device further comprises a first communication interface, and wherein the first communication interface comprises a transmitter coupled to the first terminal.

3. The system of claim 1, the one or more optical sensors comprising one or more of:
   a photoresistor sensitive to ultraviolet light, or
   an infrared sensor sensitive to infrared light.

4. The system of claim 1, the plurality of sensors further comprising one or more of:
   a thermocouple,
   a humidity sensor,
   a radio frequency sensor, or
   a vibration sensor; and
   wherein the determination of the first status data is further based on the sensor data being indicative of one or more of:
      temperature data,
      humidity data,
      radio frequency data, or
      vibration data.

5. The system of claim 1, the first hardware processor further to:
   acquire second sensor data using a receiver of a first communication interface;
   wherein the first status data is further based on the second sensor data.

6. The system of claim 1, the device further comprising one or more of:
   an electrical receptacle,
   a single pole single throw (SPST) switch, or
   a double pole double throw (DPDT) switch.

7. The system of claim 1, wherein:
the one or more optical intensity values comprise:
an ultraviolet light intensity value, and
an infrared light intensity value,
the current value is associated with a first time,
the ultraviolet light intensity value is associated with a second time after the first time, and
the infrared light intensity value is associated with a third time after the second time.

8. The system of claim 1, wherein the second hardware processor is further to:
send a notification indicative of the non-fault condition;
receive, responsive to the notification, data indicative of approval; and
wherein the operating, at the second time after the first time, the switching circuitry to electrically connect the second terminal to the third terminal is performed responsive to the data indicative of the approval.

9. A processor-implemented method comprising:
acquiring first sensor data using one or more sensors at a first instrument device, wherein the first sensor data is indicative of:
electrical current,
an ultraviolet light intensity, and
an infrared light intensity;
determining, based on the first sensor data, first status data associated with the first instrument device; and
operating, based on the first status data, first switching circuitry to establish a first state between a busbar terminal and a branch terminal, wherein the branch terminal is connected to the first instrument device;
wherein the electrical current is associated with a first time, the ultraviolet light intensity is associated with a second time after the first time, and the infrared light intensity is associated with a third time after the second time.

10. The method of claim 9, wherein the first status data is indicative of a fault and wherein the first state electrically disconnects the busbar terminal from the branch terminal.

11. The method of claim 9, further comprising:
operating, at a fourth time, the first switching circuitry to electrically disconnect the busbar terminal from the branch terminal;
wherein the first status data is indicative of a non-fault condition at the first instrument device before the fourth time; and
operating, at a fifth time, the first switching circuitry to connect the busbar terminal to the branch terminal.

12. The method of claim 9, wherein the first status data is indicative of a fault, and further wherein the first status data is based on:
the electrical current exceeding a first threshold value,
the ultraviolet light intensity exceeding a second threshold value, and
the infrared light intensity exceeding a third threshold value.

13. The method of claim 9 further comprising:
operating, at a fourth time, the first switching circuitry to electrically disconnect the busbar terminal from the branch terminal;
wherein the first status data is indicative of a non-fault condition at the first instrument device before the fourth time;
sending a notification indicative of the non-fault condition;
receiving, responsive to the notification, data indicative of approval; and
operating, at a fifth time, the first switching circuitry to connect the busbar terminal to the branch terminal.

14. A system comprising:
a first device comprising:
a first terminal;
a first plurality of sensors; and
a first hardware processor to:
acquire first sensor data using the first plurality of sensors; and
send at least a portion of the first sensor data; and
a second device comprising:
a second terminal;
a third terminal, wherein the third terminal is electrically connected to the first terminal;
switching circuitry between the second terminal and the third terminal; and
a second hardware processor to:
operate, at a first time, the switching circuitry to electrically disconnect the second terminal from the third terminal;
receive the first sensor data;
determine, based on the first sensor data, first status data indicative of a non-fault condition at the first device before the first time; and
operate, at a second time after the first time, the switching circuitry to connect the second terminal to the third terminal.

15. The system of claim 14, wherein the first sensor data is indicative of:
a current value,
an ultraviolet intensity value, and
an infrared intensity value.

16. The system of claim 14, wherein the first sensor data is indicative of:
a current value,
an ultraviolet intensity value, and
an infrared intensity value; and
wherein the second hardware processor is further to:
determine, based on the first sensor data:
the current value exceeds a first threshold value,
the ultraviolet intensity value exceeds a second threshold value, and
the infrared intensity value exceeds a third threshold value.

17. The system of claim 14, wherein the first sensor data is indicative of:
a current value associated with a third time,
an ultraviolet intensity value associated with a fourth time after the third time, and
an infrared intensity value associated with a fifth time after the fourth time; and
wherein the second hardware processor is further to:
determine, based on the first sensor data:
the current value associated with the third time exceeds a first threshold value,
the ultraviolet intensity value associated with the fourth time exceeds a second threshold value, and
the infrared intensity value associated with the fifth time exceeds a third threshold value.

18. The system of claim 14, wherein:
the second hardware processor is further to:
send a notification indicative of the non-fault condition;
receive, responsive to the notification, data indicative of approval; and
wherein the operating, at the second time after the first time, the switching circuitry to connect the second terminal to the third terminal is performed responsive to the data indicative of the approval.

19. The system of claim 14, wherein the first device further comprises a first communication interface, and wherein the first communication interface comprises a transmitter coupled to the first terminal.

20. The system of claim 14, wherein:
the first sensor data is indicative of:
  electrical current,
  an ultraviolet light intensity, and
  an infrared light intensity,
the electrical current is associated with a third time,
the ultraviolet light intensity is associated with a fourth time after the third time, and
the infrared light intensity is associated with a fifth time after the fourth time.

* * * * *

UNITED STATES PATENT AND TRADEMARK OFFICE
CERTIFICATE OF CORRECTION

PATENT NO. : 11,888,306 B1  
APPLICATION NO. : 17/660366  
DATED : January 30, 2024  
INVENTOR(S) : Cyril Arokiaraj Arool Emmanuel et al.

Page 1 of 1

It is certified that error appears in the above-identified patent and that said Letters Patent is hereby corrected as shown below:

On the Title Page

Item (56) U.S. Patent Pub. No. 2016/0188977 Kearns et al. should be removed.

Item (56) U.S. Patent Pub. No. 2021/0019536 Motoyama should be removed.

Item (56) EP 2571660 3/2013 should be removed.

Item (56) EP 2952993 12/2015 should be removed.

Item (56) WO 2018199958 11/2018 should be removed.

Item (56) Rawat, Pallav, "Environment Perception for Autonomous Driving: Al/10 Scale Implementation of Low Level Sensor Fusion Using Occupancy Grid Mapping", Mar. 1, 2019, 67 pages, Retrieved from the Internet: URL: http://www.diva-portal.org/smash/get/diva2: 1304683/FULLTEXT01.pdf. should be removed.

Item (56) Schwarzenberger, T., "Patent Cooperation Treaty International Search Report and Written Opinion dated Apr. 14, 2022", Patent Cooperation Treaty Application No. PCT/US22/70737, Patent Cooperation Treaty, Apr. 14, 2022. should be removed.

Signed and Sealed this  
Nineteenth Day of March, 2024

Katherine Kelly Vidal  
*Director of the United States Patent and Trademark Office*